(12) United States Patent
Soenarjo

(10) Patent No.: US 9,004,406 B2
(45) Date of Patent: Apr. 14, 2015

(54) AIRCRAFT WING BOX JOINT

(75) Inventor: Mochamad Agoes Soenarjo, Bristol (GB)

(73) Assignee: Airbus Operations Limited, Bristol (GB)

( * ) Notice: Subject to any disclaimer, the term of this patent is extended or adjusted under 35 U.S.C. 154(b) by 87 days.

(21) Appl. No.: 13/697,847

(22) PCT Filed: Jun. 3, 2011

(86) PCT No.: PCT/GB2011/051046
§ 371 (c)(1),
(2), (4) Date: Nov. 14, 2012

(87) PCT Pub. No.: WO2011/158015
PCT Pub. Date: Dec. 22, 2011

(65) Prior Publication Data
US 2013/0062467 A1    Mar. 14, 2013

(30) Foreign Application Priority Data
Jun. 14, 2010   (GB) .................................. 1009922.4

(51) Int. Cl.
| | |
|---|---|
| *B64C 1/26* | (2006.01) |
| *C08L 23/02* | (2006.01) |
| *C08K 5/14* | (2006.01) |
| *C08K 5/3492* | (2006.01) |
| *B64C 3/18* | (2006.01) |
| *C08K 3/04* | (2006.01) |

(52) U.S. Cl.
CPC . *C08L 23/02* (2013.01); *C08K 5/14* (2013.01); *C08K 5/34924* (2013.01); *B64C 1/26* (2013.01); *B64C 3/187* (2013.01); *C08K 3/04* (2013.01)

(58) Field of Classification Search
CPC ............ B64C 1/26; B64C 1/069; B64C 3/18; B64C 3/187
USPC .................... 244/131, 123.1, 117 R, 119, 120
See application file for complete search history.

(56) References Cited

U.S. PATENT DOCUMENTS

| | | | |
|---|---|---|---|
| 6,314,630 B1 | 11/2001 | Munk et al. | |
| 2007/0023573 A1* | 2/2007 | Neale et al. | .................... 244/124 |
| 2010/0170986 A1 | 7/2010 | Lafly et al. | |

FOREIGN PATENT DOCUMENTS

| | | |
|---|---|---|
| EP | 1544099 A1 | 6/2005 |
| FR | 2916417 A1 | 11/2008 |
| WO | 2008152248 A2 | 12/2008 |

OTHER PUBLICATIONS

Search Report corresponding to GB1009922.4, dated Sep. 9, 2010.
International Search Report corresponding to PCT/GB2011/051046, dated Dec. 22, 2011.

* cited by examiner

*Primary Examiner* — Tien Dinh
*Assistant Examiner* — Richard R Green
(74) *Attorney, Agent, or Firm* — Lowe Hauptman & Ham, LLP

(57) ABSTRACT

An aircraft wing box spanwise joint, comprising a rib having a web, and a pair of rib fittings joined together, each rib fitting forming a closed loop around the periphery of the rib, wherein the rib is integrally formed with one of the rib fittings. Also, an aircraft wing including two or more of the joints. Also, a method of forming an aircraft wing box spanwise joint, the method comprising forming a pair of rib fittings, wherein one of the rib fittings is integrally formed with a rib having a web, each rib fitting forming a closed loop around the periphery of the rib, bringing the rib fittings together, and joining the rib fittings together.

15 Claims, 7 Drawing Sheets

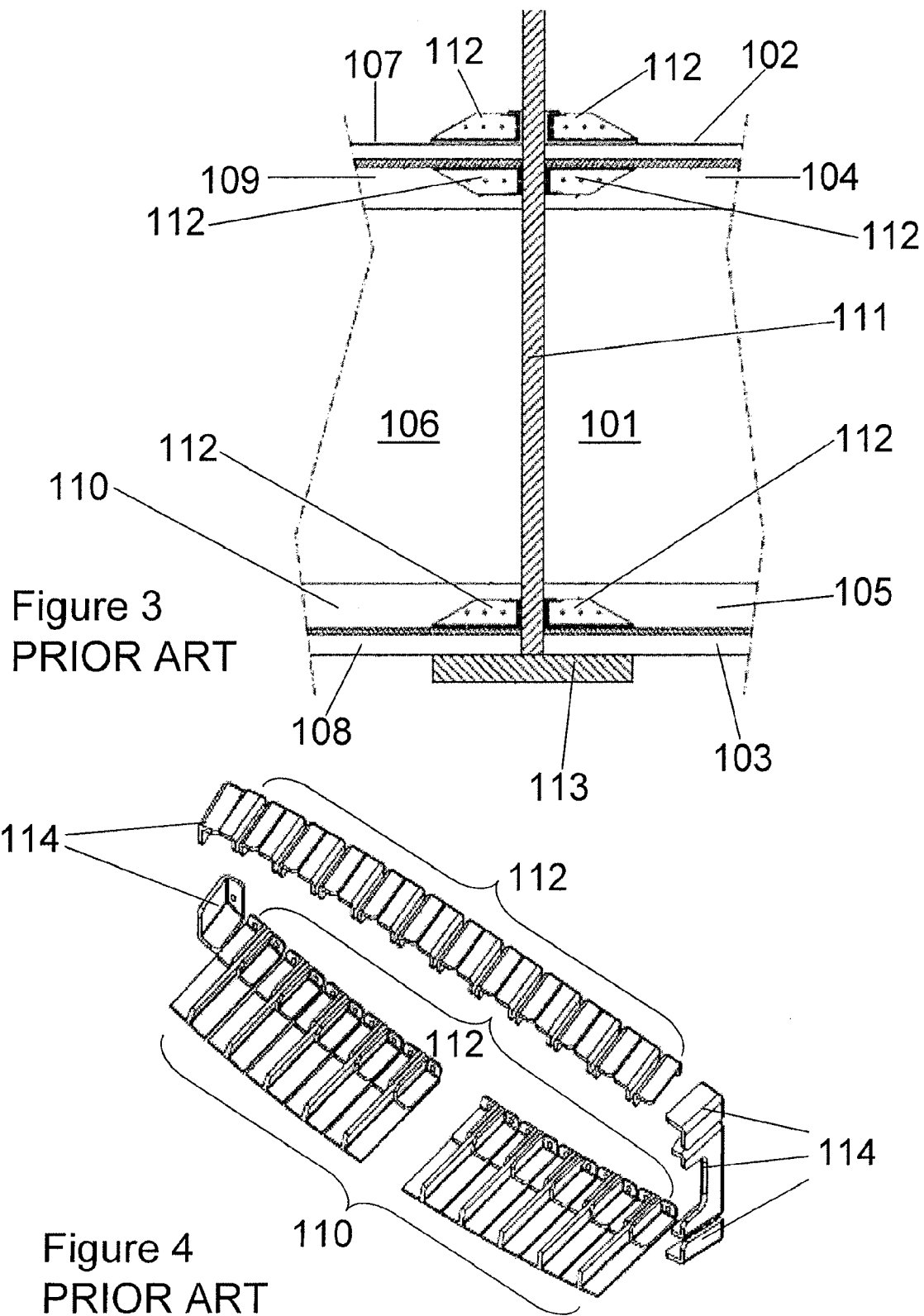

View on A

AIRCRAFT WING BOX JOINT

RELATED APPLICATIONS

The present application is a National Phase of International Application Number PCT/GB2011/051046, filed Jun. 3, 2011, and claims priority from British Application Number 1009922.4, filed Jun. 14, 2010.

FIELD OF THE INVENTION

The present invention relates to an aircraft wing box spanwise joint. The invention also relates to an aircraft wing including two or more of the joints, and a method of forming the joint.

BACKGROUND OF THE INVENTION

An aircraft wing box typically includes a front spar, a rear spar, upper and lower covers (skins), spanwise stiffeners (stringers), and chordwise ribs. The wing box structure is typically manufactured in sections, which are joined together. Most commercial airliners have three wing box sections—a centre wing box structure in the fuselage and two lateral (left and right) wing box structures. However, the centre and/or lateral wing box structures may themselves comprise several wing box sections joined together by one or more spanwise joints.

In the typical three wing box section arrangement, the lateral wing box structures are joined to either side of the centre wing box structure by a "root joint". FIGS. 1 and 2 illustrate schematic views of the central portion of one half of an aircraft 1, and show the location of the root joint 2 between the lateral wing box 3 and the centre wing box 4 embedded in the fuselage 5.

In a prior art arrangement shown in FIGS. 3 and 4, a root rib 111 forms the interface between the centre wing box 101 and the lateral wing box 106. Alternatively, the root rib can be considered to be part of either the centre wing box or the lateral wing box.

The covers and spars of the centre wing box and of the lateral wing box are typically joined to the root rib by several fittings. FIG. 3 illustrates a schematic section view of the central portion of the prior art root joint. The centre wing box 101 includes an upper cover 102 and a lower cover 103 extending between front and rear spars (not shown). The upper cover is supported by stringers 104 and the lower cover is supported by stringers 105. The lateral wing box 106 includes an upper cover 107 and a lower cover 108 extending between front and rear spars (not shown). The upper cover is supported by stringers 109 and the lower cover is supported by stringers 110. A root rib 111 forms the interface between the centre and lateral wing boxes 101, 106.

A plurality of corner fittings 112 are used to connect the wing boxes 101, 106 to opposite sides of the root rib 111. The base of each fitting 112 is fastened to one of the covers 102, 103, 107, 108 and to the foot of one of the stringers 104, 105, 109, 110. The end of each fitting 112 is fastened to the root rib 111. The side of each fitting 112 is fastened to the blade of one of the stringers 104, 105, 109, 110. The fasteners have been omitted from FIG. 3. A splice plate 113 is also fastened between the lower covers 103, 108.

FIG. 4 illustrates an array of the prior art fittings 112 used around the periphery of the lateral wing box 106. The lower row of fittings 112 are shown attached to their stringers 110. In addition to the fittings 112, spar fittings 114 are provided for connecting the front and rear spars (not shown) of the lateral wing box to the root rib.

As can be seen from FIGS. 3 and 4, the prior art root joint requires a large number of fittings and fasteners to form the joint, which causes a significant weight penalty. The large number of fasteners and alignment issues leads to a long root joint formation time on the aircraft final assembly line, which reduces productivity. The wing box interiors are typically used as fuel tanks, which can be difficult to seal due to the complex root joint. Moreover, the dihedral and sweep angles of the lateral wing box with respect to the root rib pose difficulties in terms of access for fastener tools used to fasten the wing box to the rib.

In more unconventional aircraft, which comprise several wing box structures joined together by spanwise joints (whether or not they appear at the actual wing root), the above-mentioned problems with the prior art spanwise joints are also evident.

There is therefore a need for an improved wing box spanwise joint, which addresses some or all of the above problems in the prior art.

SUMMARY OF THE INVENTION

A first aspect of the invention provides an aircraft wing box spanwise joint comprising a rib having a web, and a pair of rib fittings joined together, each rib fitting forming a closed loop around the periphery of the rib, wherein the rib is integrally formed with one of the rib fittings A further aspect of the invention provides an aircraft wing including two or more of the joints.

A yet further aspect of the invention provides a method of forming an aircraft wing box spanwise joint, the method comprising forming a pair of rib fittings, wherein one of the rib fittings is integrally formed with a rib having a web, each rib fitting forming a closed loop around the periphery of the rib, bringing the rib fittings together, and joining the rib fittings together.

The invention is advantageous in that sections of an aircraft wing box may be joined together more easily with fewer parts, reducing weight, part count and assembly time.

Each rib fitting may include a spanwise projecting flange. Since the aircraft wing may have dihedral or sweep, the flange will generally not be perpendicular to the web. However, it may be perpendicular depending on the aircraft wing design. The flange may form a closed loop around the periphery of the rib.

In a preferred embodiment, each rib fitting has a substantially L-shaped cross-section extending around the rib to form the closed loop. The rib fittings may each have a planar abutting surface such that the rib fittings may be joined back-to-back with their surfaces abutting. This allows for a simple joint construction, which can be readily assembled and disassembled for maintenance.

The rib fittings may be joined together by fastening. Preferably, each rib fitting has a plurality of fastener receiving holes around the periphery of the rib. These are preferably formed in the abutting surfaces of the rib fittings.

Since the rib is integrally formed with only one of the rib fittings, the other rib fitting may have a central void. Alternatively, the other rib fitting may include cross bracing for additional strength, where desired. The void provides weight saving.

Stiffeners may be provided for supporting the rib web. Preferably, the stiffeners are integrally formed with the rib web.

The joint may be used to join two wing box structures, wherein each rib fitting forms part of a respective one of the wing box structures. Each wing box structure may be a centre or lateral wing box structure, or part thereof. In one embodiment, the joint is a root joint between a centre wing box structure and a lateral wing box structure.

Each wing box structure may include wing box covers, and the rib fittings may be attached to the covers of their respective wing box structure.

Each wing box structure may include wing box spars, and the rib fittings may be attached to the spars of their respective wing box structure.

In the method, each rib fitting may form part of a wing box structure, and the method may further comprise attaching each rib fitting to the remainder of its wing box structure. Furthermore, each rib fitting may be attached to the remainder of its wing box structure prior to joining the rib fittings together. In this way, various wing box subassemblies can be formed, each including one or more interfacing rib fittings. The subassemblies can be joined together by forming the joint with the interfacing rib fittings so as to construct a completed wing box assembly.

BRIEF DESCRIPTION OF THE DRAWINGS

Embodiments of the invention will now be described with reference to the accompanying drawings, in which:

FIG. 3 illustrates a schematic section view of the central portion of a prior art wing root joint;

FIG. 4 illustrates an array of prior art fittings used in the root joint of FIG. 3, together with part of a lower set of stringers;

DETAILED DESCRIPTION OF EMBODIMENT(S)

Figure 1:
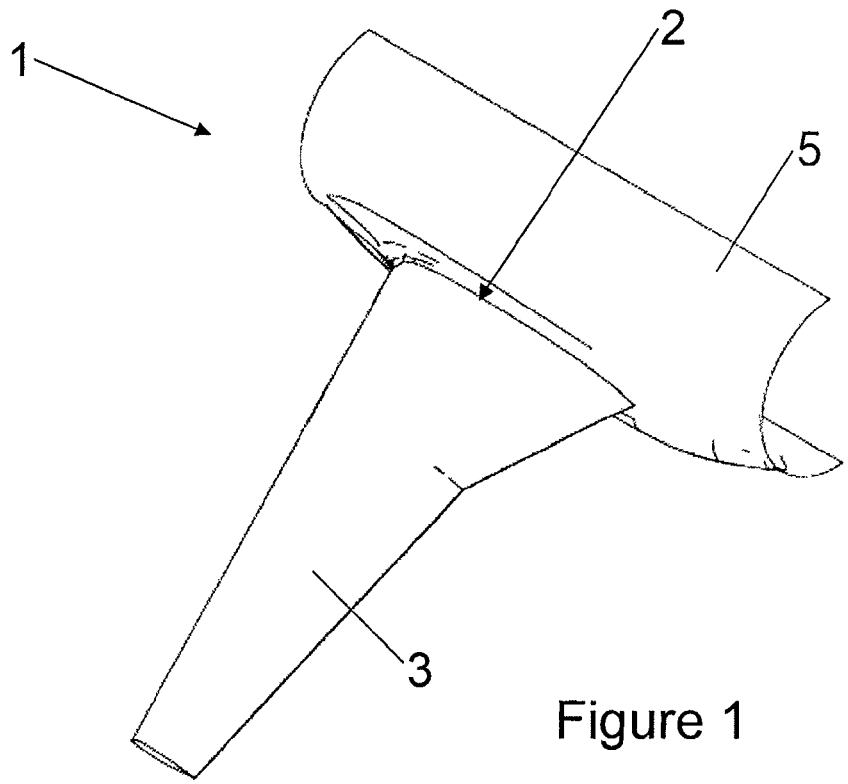
FIG. 1 illustrates a schematic view of the central portion of one side of an aircraft.
Figure 2:
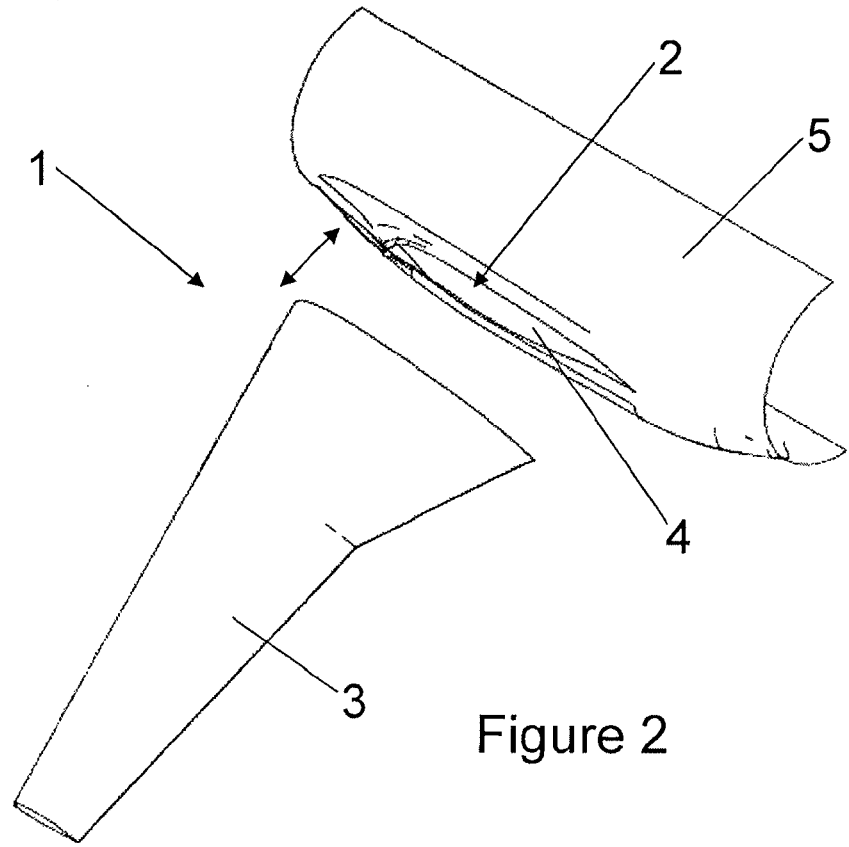
FIG. 2 illustrates a exploded view of the aircraft of FIG. 1, showing the location of the wing root joint.
Figure 5:
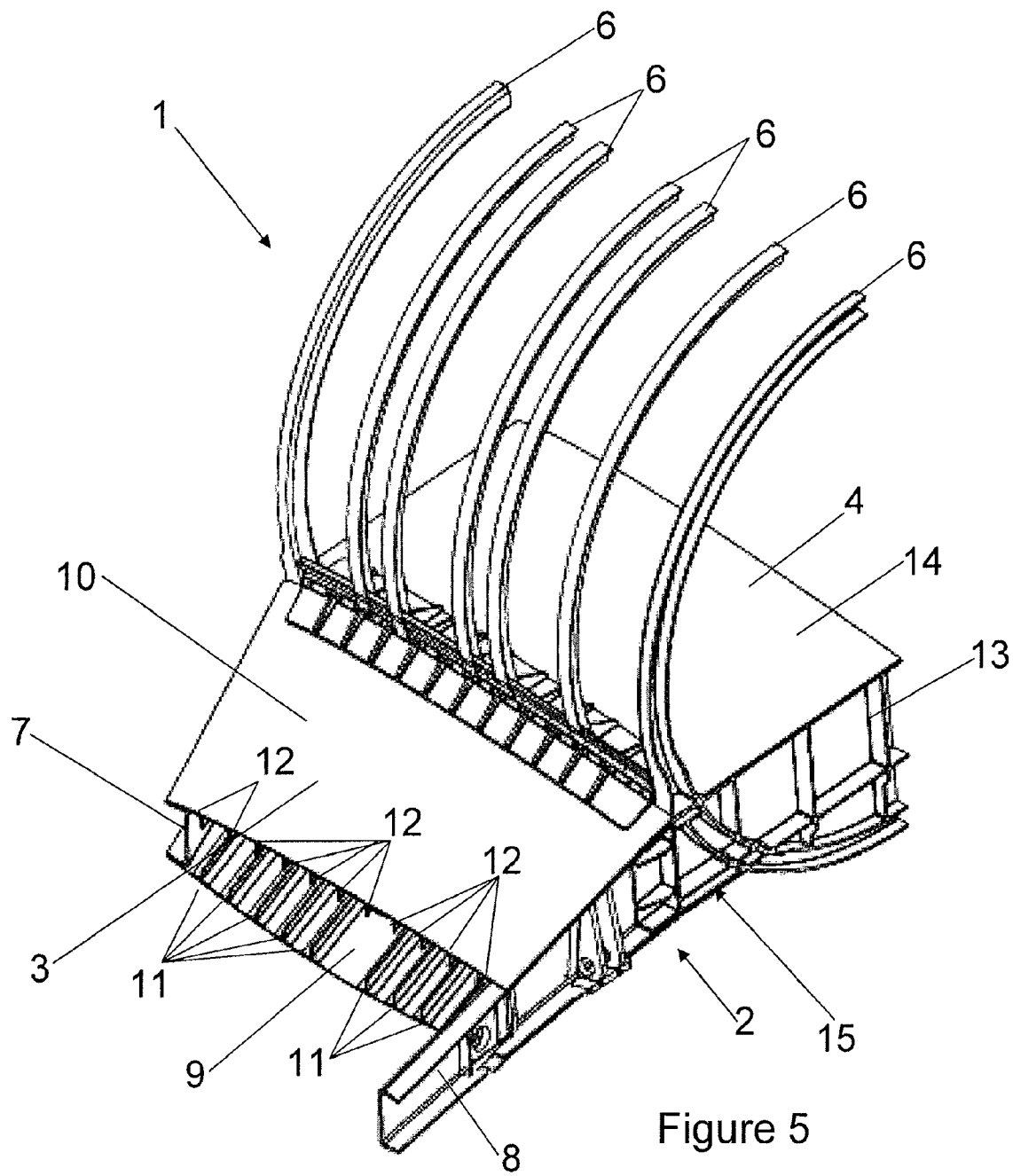
FIG. 5 illustrates a partial view of a wing root joint in accordance with this invention.

FIG. 5 illustrates a partial view of a "root joint", which is provided as an example of an aircraft wing box spanwise joint. As can be seen from FIG. 5, the aircraft fuselage includes a plurality of fuselage frames 6, which extend around the fuselage. Embedded in the fuselage is the centre wing box structure 4. The centre wing box structure 4 is joined to the lateral wing box structure 3 by a root joint 2. The lateral wing box structure 3 includes a front spar 7, a rear spar 8, a lower wing cover 9 and an upper wing cover 10. The lower wing cover 9 is supported by stringers 11. The upper wing cover 10 is supported by stringers 12. The stringers may be integrally formed with the upper and lower wing covers.

The centre wing box 4 includes a front spar (not shown), a rear spar 13, an upper wing box cover 14, and a lower wing box cover 15. The upper and lower covers 14, 15 of the centre wing box structure 4 are also supported by spanwise stiffeners (not shown). Although not shown in FIG. 5, the wing box structures 3, 4 further comprise chordwise extending ribs at spaced intervals in the spanwise direction.

Figure 6:
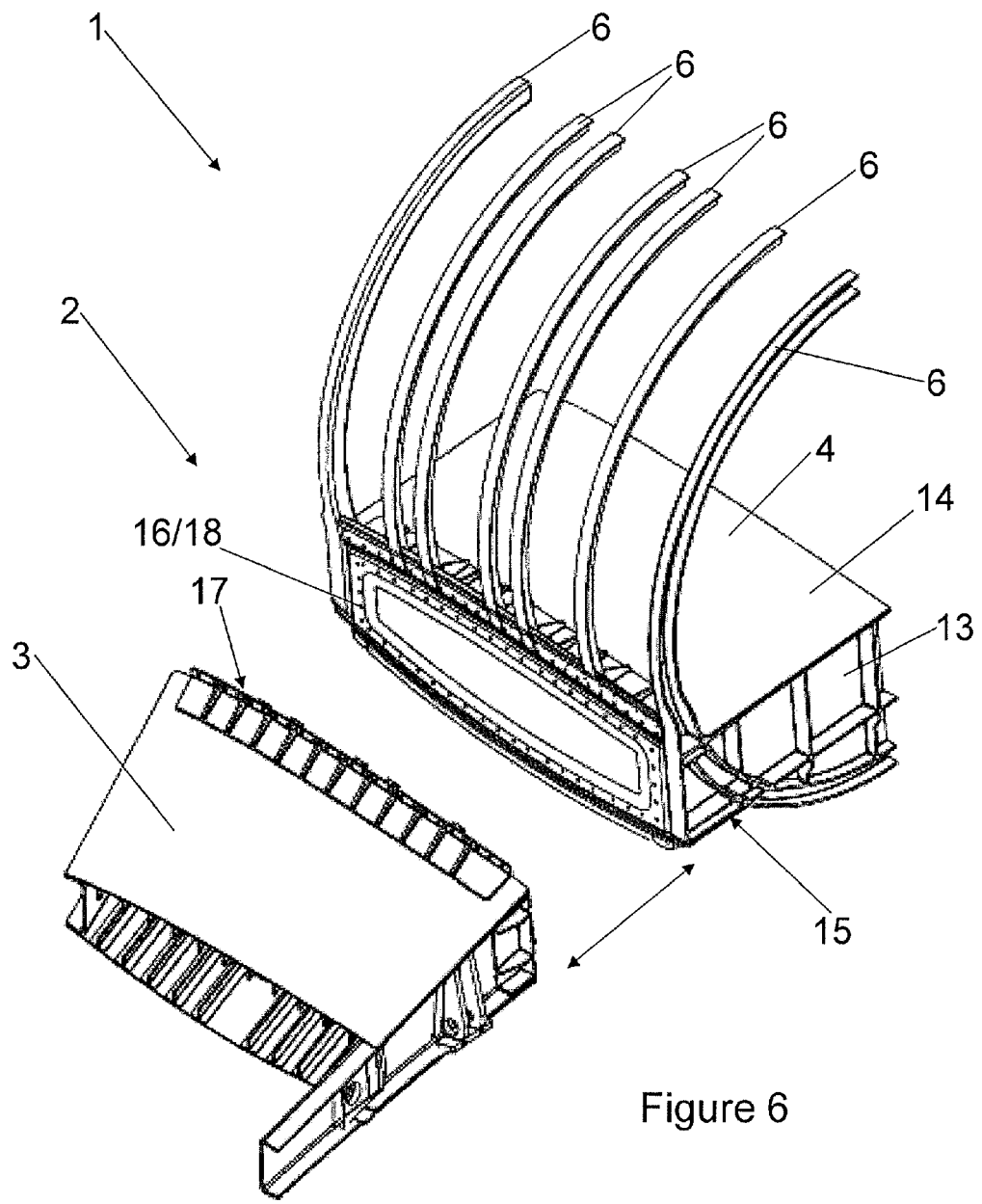
FIG. 6 illustrates an exploded view of the root joint of FIG. 5.

FIG. 6 illustrates the spanwise root joint 2 more clearly as it shows the partial view of FIG. 5 in an exploded configuration with the lateral wing box 3 detached from the centre wing box 4. As shown in FIG. 6, the centre wing box 4 includes a integral root rib and rib fitting 16/18, which forms part of the root joint 2. The integral rib and rib fitting 16/18 forms part of the centre wing box structure 4 and is attached to and extends between the upper and lower covers 14 and 15. The integral rib and rib fitting 16/18 is also attached to and extends between the front spar (not shown) and the rear spear 13.

Figure 7:
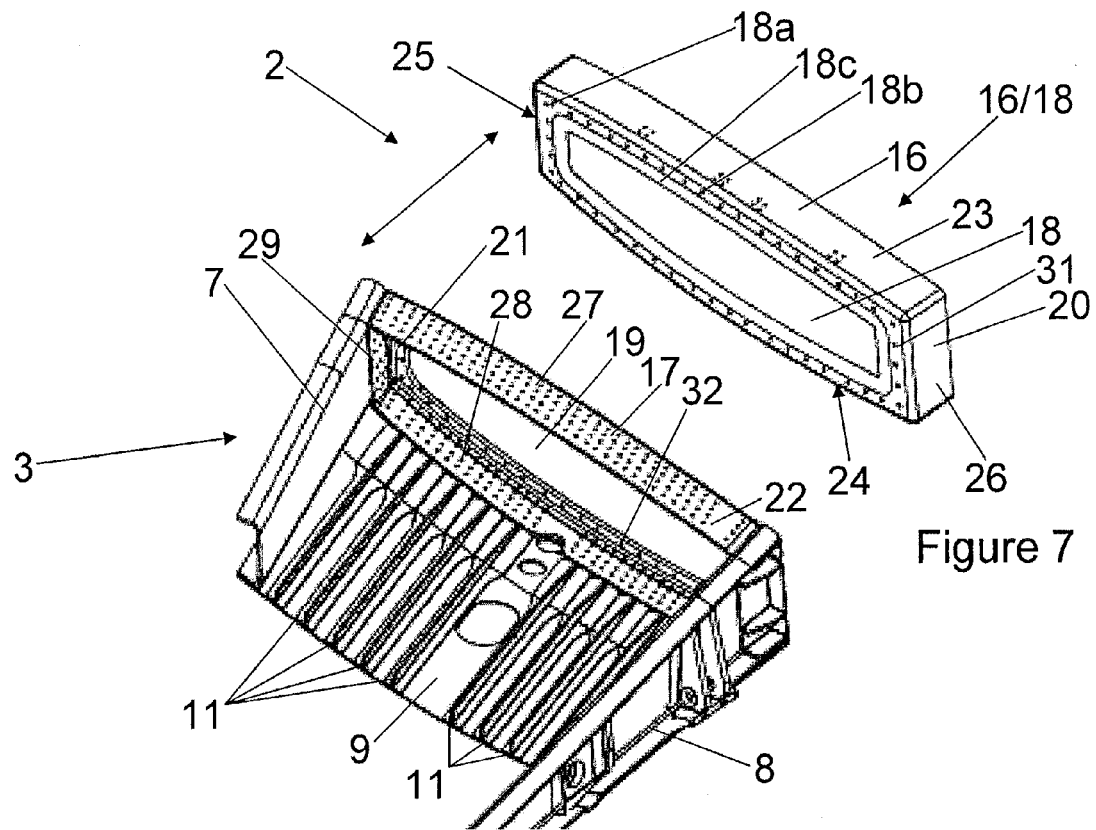
FIG. 7 illustrates a detailed view of the centre wing box integral root rib and rib fitting and the lateral wing box rib fitting.

FIG. 7 illustrates a more detailed partial view of the exploded root joint 2. The integral rib and rib fitting 16/18 is a unitary component comprising a rib fitting 16 and an integrally thinned rib having an upstanding web 18. The rib fitting 16 forms a closed loop around the periphery of the rib web 18. The rib fitting 16 has a substantially L-shaped cross section, which extends around the rib web 18. One arm of the L-shaped section forms an upright flange 18a and the other arm forms a spanwise projecting flange 20. The spanwise flange 20 projects inboard of the rib web 18. The spanwise flange 20 forms a closed loop around the periphery of the rib web 18.

As can be seen from FIG. 7, the lateral wing box structure 3 includes a rib fitting 17. The rib fitting 17 is structurally similar to the rib fitting 16 but is not integrally formed with a rib web. The rib fitting 17 forms a closed loop around the periphery of the rib web 18, albeit offset from the web 18 in the spanwise direction. The rib fitting 17, like the fitting 16, has a substantially L-shaped cross section, which extends around the rib web 18. One arm of the L-shaped section forms an upright flange 21 and the other arm forms a spanwise projecting flange 22. The spanwise flange 22 projects outboard of the rib web 18. The spanwise flange 22 forms a closed loop around the periphery of the rib web 18. Since the rib fitting 17 has no integral rib web, there is a central void 19 in the rib fitting 17.

The spanwise flange 20 of the centre wing box rib fitting 16 is continuous around its rib web 18. The spanwise flange 20 includes upper 23, lower 24, front 25 and rear 26 flange portions. The upper flange portion 23 is attached to the upper cover 14, the lower flange portion 24 is attached to the lower cover 15, the front flange portion 25 is connected to the front spar (not shown) and the rear flange portion 26 is attached to the rear spar 13 of the centre wing box structure 4.

The spanwise flange 22 of the lateral wing box rib fitting 17 is continuous around the rib web 18 and includes upper 27, lower 28, front 29 and rear 30 flange portions. The upper flange portion 27 is attached to the upper cover 10, the lower flange portion 28 is attached to the lower cover 9, the front flange portion 29 is attached to the front spar 7 and the rear flange portion 30 is attached to the rear spar 8 of the lateral wing box 3.

The spanwise flanges 20 and 22 are tapered in the direction away from the rib web 18 to provide a smooth load transition from the joint 2 into the remainder of their respective wing box structures 3, 4.

The upright flange 18a of the integral rib and rib fitting 16/18 has a substantially planar interfacing surface 18b facing the rib fitting 17. The rib web 18 has a reduced thickness compared to the upright flange 18a which surrounds it. The rib web 18 has a ramped portion 18c to provide a smooth load transition from the joint 2 into the rib web 18.

The upright flange 21 of the lateral wing box rib fitting 17 has a substantially planar interfacing surface 21a facing towards the rib fitting 16.

Figure 8:
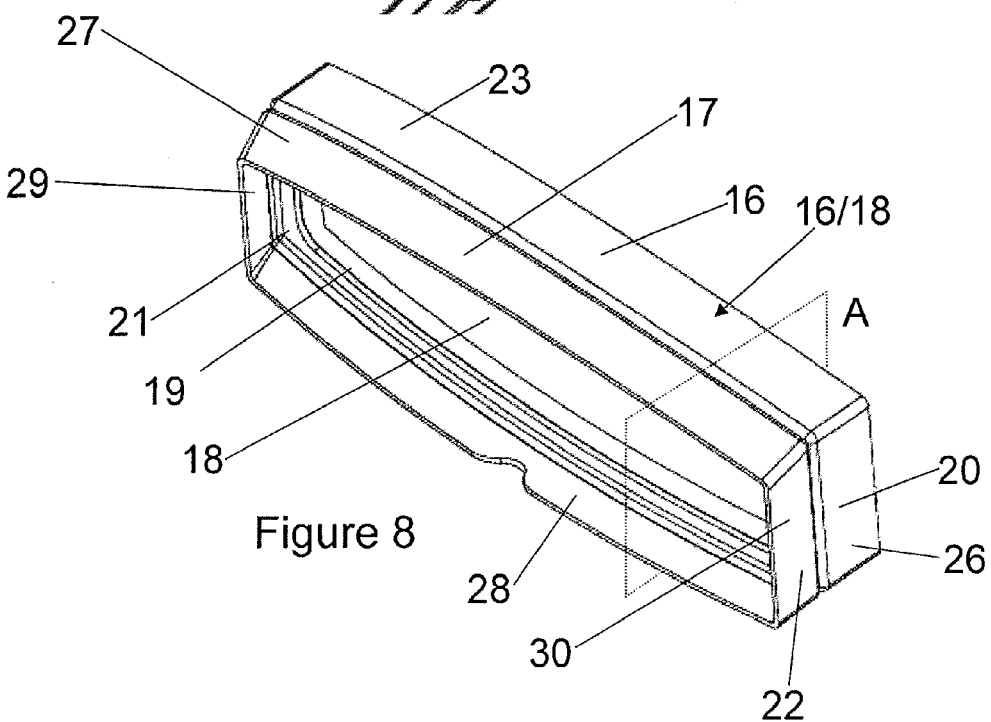
FIG. 8 illustrates the root rib and rib fittings joined together back-to-back.

FIG. 8 illustrates the integral rib and rib fitting 16/18 and the rib fitting 17 in isolation with their upright flanges 18a and 21 disposed in a back-to-back relationship such that the substantially planar surface 18b of the integral rib and rib fitting 16/18 abuts the substantially planar surface 21a of the rib fitting 17.

Figure 9:
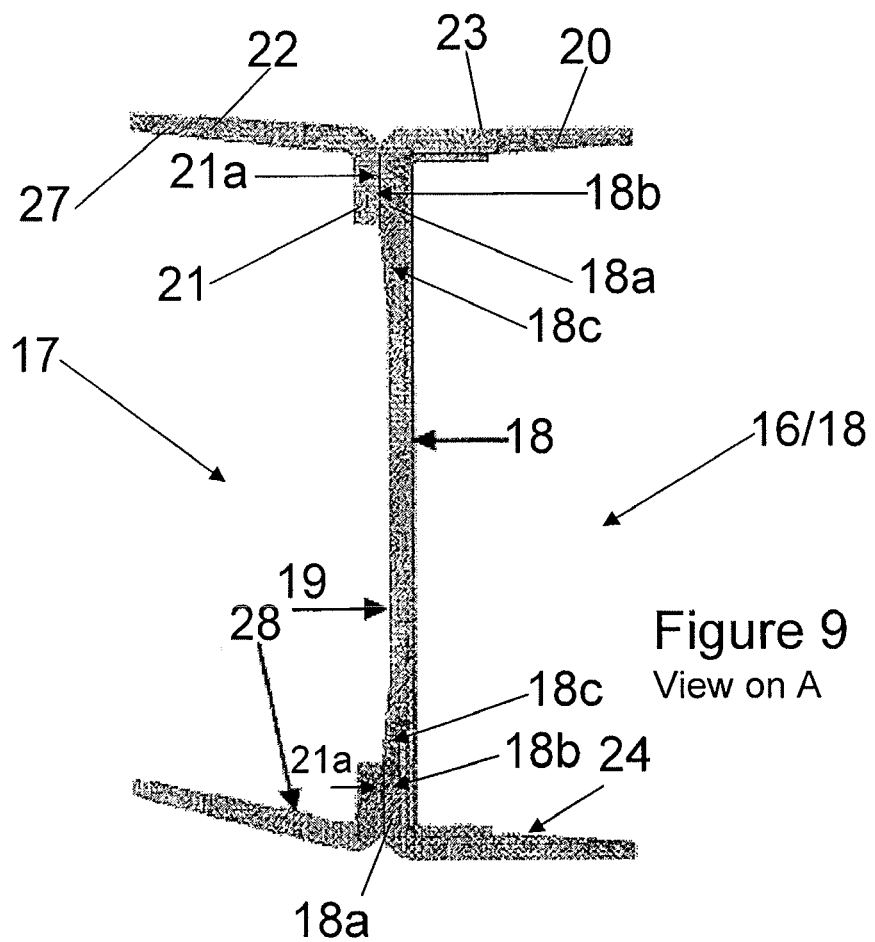
FIG. 9 illustrates a section view through the rib and rib fittings of FIG. 8.

FIG. 9 illustrates a section view through the integral rib and rib fitting 16/18 and the rib fitting 17 on plane A in FIG. 8. Back-to-back rib fittings 16 and 17 are joined together by fastening the upright flanges 18a and 21 together by their abutting planar surfaces 18b and 21a. Referring back to FIG. 7, it can be seen that the centre wing box integral rib and rib fitting 16/18 has a row of fastener holes 31 extending through the surface 18b around the periphery of the rib web 18. Likewise, the lateral wing box rib fitting 17 has a row of fastener holes 32 extending through the surface 21a around the periphery of the rib web 18. The row of fastener holes 31 is aligned with the row of fastener holes 32. The fasteners themselves are not shown in the Figures but will typically be releasable nut and bolt assemblies. The joint between the rib fittings 16 and 17 is therefore a tension type joint. This enables the lateral wing box structure 3 to be removed for inspection and maintenance purposes.

Figure 10:
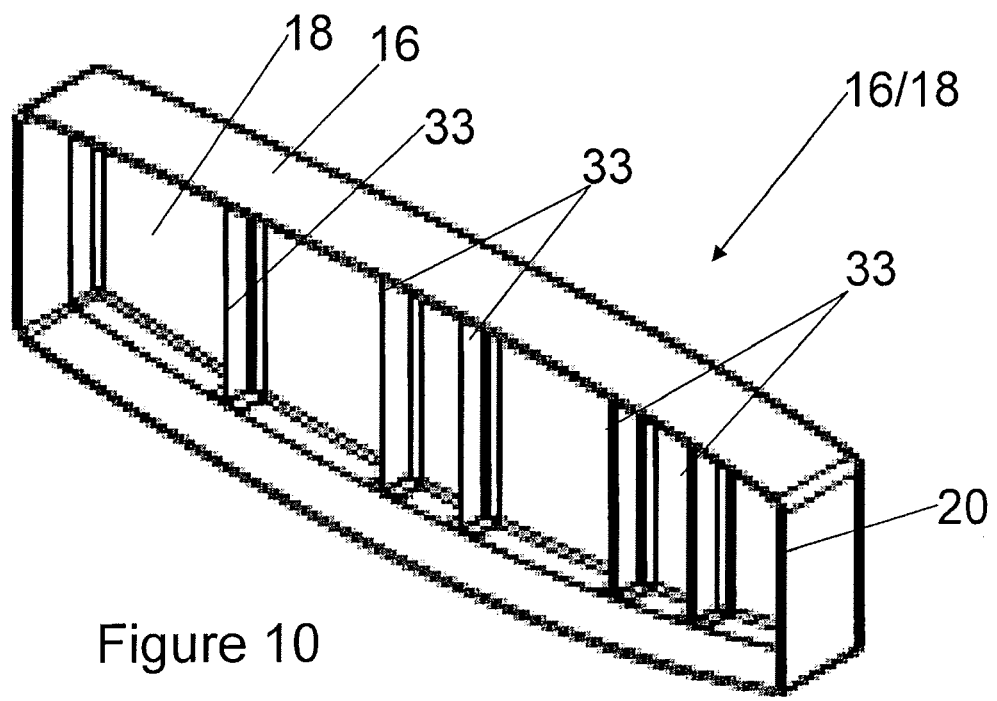
FIG. 10 illustrates the centre wing box integral root rib and rib fitting from the front.

FIG. 10 illustrates the centre wing box integral rib and rib fitting 16/18 from the front. From this view it can be seen that the integral part 16/18 has a set of reinforcing stiffeners 33 for supporting the rib web 18. The stiffeners 33 are integrally formed with the rib web 18 and the spanwise flange 20. In other words, the stiffened part 16/18/33 is an integral, unitary component. The stiffeners 33 help to support vertical load through the rib web 18. The locations of the stiffeners 33 are coincident with the location of the fuselage frames 6 (see FIG. 6) as the load transferred into the integral part 16/18/33 at the terminations of these frames 6 may otherwise cause significant stress concentrations which the rib web 18 alone cannot support. In addition, the stiffeners 33 support the rib web 18 against buckling due to sheer load and fuel pressure.

Figure 11:
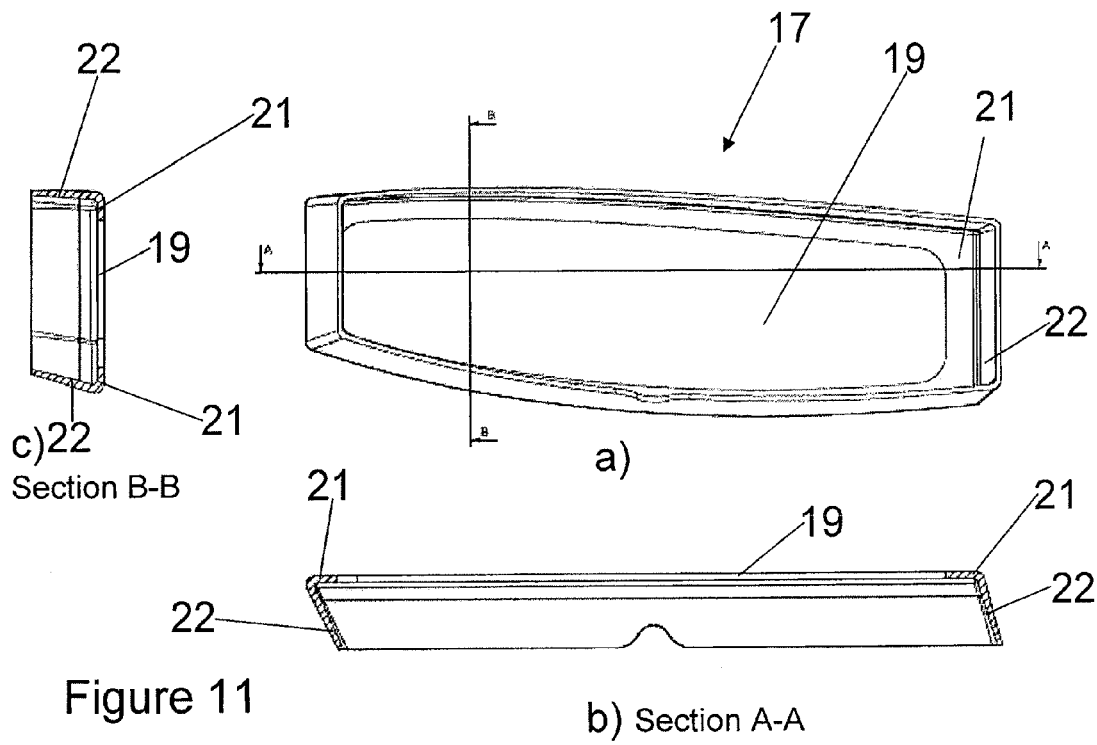
FIG. 11 illustrates various views of the lateral wing box root rib fitting.
Figure 12:
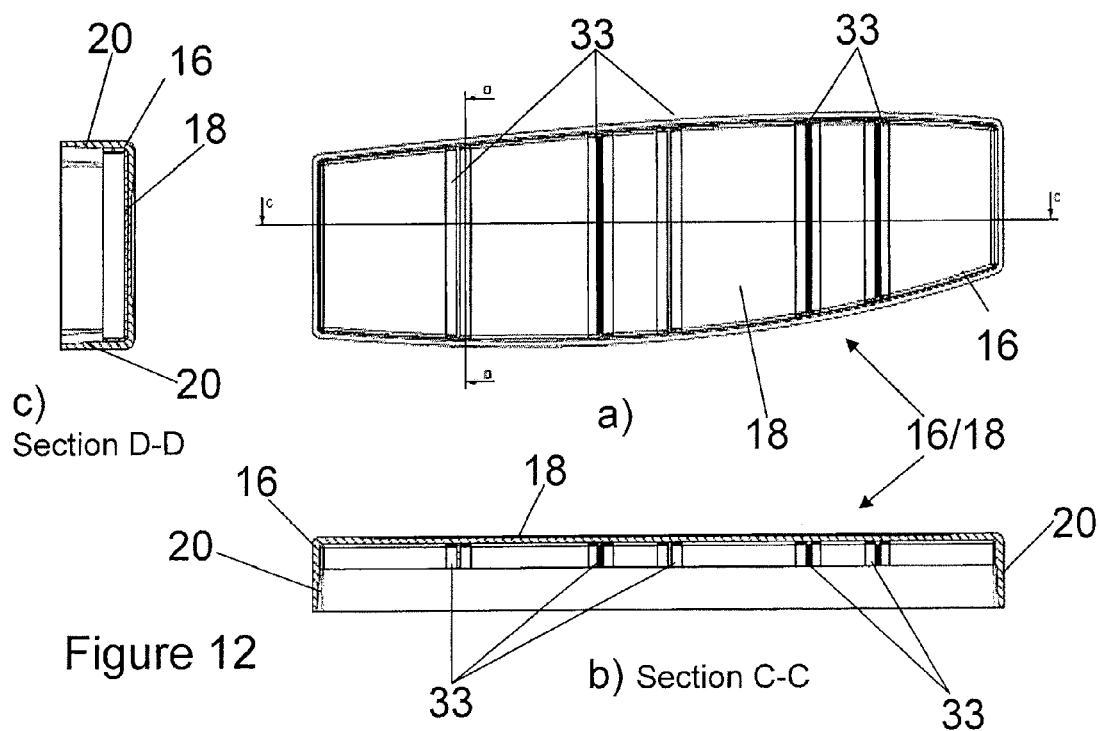
FIG. 12 illustrates various views of the centre wing box integral root rib and rib fitting.

FIG. 11 shows various detailed views of the rib 17 and FIG. 12 shows various detailed views of the integral rib and rib fitting 16/18.

A method of forming an aircraft wing box spanwise joint will now be described. The rib fitting 17 and the integral rib and rib fitting 16/18 are each formed as integral, unitary components. The centre wing box rib and rib fitting 16/18 is attached by its spanwise flange 20 to the remainder of the centre wing box structure 4 as previously described. Similarly, the lateral wing box rib fitting 17 is attached by its spanwise flange 22 to the remainder of the lateral wing box structure 3. The centre wing box structure 4 is typically formed as a subassembly attached to the fuselage frames 6 prior to attachment of the wings on the aircraft final assembly line.

The wing subassemblies are then brought into position so as to attach the wings to the fuselage. During this process the lateral wing box rib fitting 17 is brought into abutment with the centre wing box integral rib and rib fitting 16/18 such that the interfacing substantially planar upright flange surfaces 21a and 18b abut. The pre-drilled rows of fastener holes 31 and 32 will be brought into alignment during this process such that fasteners may be disposed through the rows of fastener holes 31 and 32 to thereby join the lateral wing box structure 3 to the centre wing box structure 4 via a tension type joint. This is repeated on the other side of the centre wing box structure 4 for attachment of the other lateral wing box (not shown).

The spanwise flanges 20 and 22 of the rib fittings 16 and 17 effectively act to replace the rows of fittings 112 and 114 shown in the prior art arrangement of FIGS. 3 and 4. As can readily be seen by comparing FIG. 8 with FIG. 4, the part count has been considerably reduced. This provides a far simpler fastener arrangement to form the spanwise joint 2. Whereas in FIG. 4, the location of the individual fittings 112 is dependent upon the location of the stringers 110, it can be seen from FIG. 7 that the rib fitting 17 has no dependency upon the stringers 11. The stringers are necessarily run out (terminated) before the rib fitting 17 such that the lower spanwise flange portion 28 of the rib fitting 17 can be attached to the lower cover 9. This is beneficial since the location of the row of fastener holes 32 in the rib fitting 17 is virtually independent of the alignment of the stringers 11. In the prior art joint shown in FIG. 4, the fittings 112 having the fastener holes are dictated by alignment of the stringers 110.

As is conventional, the wing box structures 3 and 4 are used as fuel tanks for the aircraft 1. The large number of individual components and fasteners in the prior art joint shown in FIGS. 3 and 4 is problematic for testing fuel tank sealing and pressure testing. By contrast, the far simpler spanwise joint 2 having fewer components and fewer fasteners is easier to seal and pressure test.

By removing the dependency of the fastener holes on the stringer alignment, the joint 2 provides improved access for fastener tools for joining the rib fittings 16 and 17 together. By positioning the rows of fasteners receiving holes 31 and 32 around the periphery of the rib web 18 the time required on the aircraft final assembly line to join the lateral wing box structure 3 to the centre wing box structure 4 may be significantly reduced.

The rib fitting 17 and the integral rib and rib fitting 16/18 can be formed of composite material or more traditional metallic materials. In the case of composite structural design, these parts can be accurately formed by resin transfer moulding (RTM). Alternatively, it will be appreciated that other composite manufacturing techniques may be used. In the case of metallic construction, these parts may be formed by machining, forging or casting, for example. In the case of forming the parts 17 and 16/18 by RTM, this provides a low cost and highly repetitive and controllable tolerance process. When made from composite material by RTM, it becomes possible to eliminate galvanic corrosion and thermal expansion incompatibilities that can be evident in hybrid (composite and metallic) wing box arrangements.

By providing the stiffeners 33 integral with the part 16/18, part count and weight are reduced.

It will be appreciated that the stiffeners will not always be required, depending on the load in the rib web. Alternatively, the stiffeners may be separate components attached to the web. It will further be appreciated that the rib fitting 17 may also be integrally formed with a rib web to form a second integral rib and rib fitting. Alternatively, the rib fitting 17 may have cross bracing (integral or otherwise) for supporting greater load.

Whilst in the embodiment described above, which relates to a root joint, the rib fittings are joined by fasteners, it will be appreciated that the ribs could be joined together in other ways. Releasable fasteners are beneficial in the case of a root joint such that the joint can be disassembled for maintenance or inspection purposes. However, where the wing box structures are manufactured in sections which are joined together on the final assembly line and which are not intended to be disassembled thereafter, there will be no need for releasable fasteners to be used. In this instance, the back-to-back rib fittings may be joined by bonding or using non-releasable fasteners, for example.

Although the invention has been described above with reference to one or more preferred embodiments, it will be appreciated that various changes or modifications may be made without departing from the scope of the invention as defined in the appended claims.

The invention claimed is:

1. An aircraft wing box spanwise joint comprising a rib having a web, and a pair of rib fittings, wherein the rib is integrally formed with one of the rib fittings, each rib fitting including a planar abutment surface and a spanwise projecting flange forming a closed loop around the periphery of the rib, and wherein the rib fittings are joined back-to-back by their planar abutment surfaces.

2. A joint according to claim 1, wherein each rib fitting has a substantially L-shaped cross-section extending around the rib to form the closed loop.

3. A joint according to claim 1, wherein the rib fittings are joined together by fastening.

4. A joint according to claim 1, wherein the other rib fitting has a central void.

5. A joint according to claim 1, further comprising stiffeners supporting the rib web.

6. A joint according to claim 5, wherein the stiffeners are integrally formed with the rib web.

7. A joint according to claim 1, which joins two wing box structures, wherein each rib fitting forms part of a respective one of the wing box structures.

8. A joint according to claim 7, wherein each wing box structure is a centre or lateral wing box structure, or part thereof.

9. A joint according to claim 8, wherein the joint is a root joint between a centre wing box structure and a lateral wing box structure.

10. A joint according to claim 7, wherein each wing box structure includes wing box covers, and the rib fittings are attached to the covers of their respective wing box structure.

11. A joint according to claim 7, wherein each wing box structure includes wing box spars, and the rib fittings are attached to the spars of their respective wing box structure.

12. An aircraft wing including two or more joints in accordance with claim 1.

13. A method of forming an aircraft wing box spanwise joint, the method comprising forming a pair of rib fittings, wherein one of the rib fittings is integrally formed with a rib having a web, each rib fitting including a planar abutment surface and a spanwise projection flange forming a closed loop around the periphery of the rib, bringing the rib fittings together, and joining the rib fittings together in back-to-back relation by their planar abutment surfaces.

14. A method according to claim 13, wherein each rib fitting forms part of a wing box structure, and the method further comprises attaching each rib fitting to the remainder of its wing box structure.

15. A method according to claim 14, wherein each rib fitting is attached to the remainder of its wing box structure prior to joining the rib fittings together.

* * * * *